United States Patent
Zhao et al.

(10) Patent No.: US 9,781,717 B2
(45) Date of Patent: Oct. 3, 2017

(54) METHOD, DEVICE AND SYSTEM FOR TRANSMITTING UPLINK INFORMATION

(71) Applicant: China Academy of Telecommunications Technology, Bejing (CN)

(72) Inventors: Yali Zhao, Beijing (CN); Fangli Xu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 304 days.

(21) Appl. No.: 14/651,658

(22) PCT Filed: Dec. 26, 2013

(86) PCT No.: PCT/CN2013/090598
§ 371 (c)(1),
(2) Date: Jun. 11, 2015

(87) PCT Pub. No.: WO2014/101801
PCT Pub. Date: Jul. 3, 2014

(65) Prior Publication Data
US 2015/0334705 A1     Nov. 19, 2015

(30) Foreign Application Priority Data

Dec. 27, 2012   (CN) .......................... 2012 1 0581372

(51) Int. Cl.
*H04W 4/00*        (2009.01)
*H04W 72/04*       (2009.01)
(Continued)

(52) U.S. Cl.
CPC ....... *H04W 72/0446* (2013.01); *H04W 36/22* (2013.01); *H04W 36/04* (2013.01);
(Continued)

(58) Field of Classification Search
CPC .......................... H04W 72/0446; H04W 36/22
(Continued)

(56) References Cited

U.S. PATENT DOCUMENTS

| 9,549,382 B2 * | 1/2017 | Dinan ................... H04W 52/60 |
| 2012/0106404 A1 | 5/2012 | Damnjanovic |
| 2014/0126403 A1 * | 5/2014 | Siomina ................ H04W 24/10 370/252 |

FOREIGN PATENT DOCUMENTS

| CN | 101026852 A | 8/2007 |
| CN | 101867964 A | 10/2010 |

(Continued)

OTHER PUBLICATIONS

The Extended European Search Report issued on Nov. 23, 2015 in the EP counterpart application (13867568.1).
International Search Report for PCT/CN2013/090598.

*Primary Examiner* — Samina Choudhry
(74) *Attorney, Agent, or Firm* — Kilpatrick Townsend & Stockton LLP

(57) ABSTRACT

Disclosed are a method, device and system for transmitting uplink information, which are used for solving the problem that the existing UE uplink transmission mechanism may increase the load of a Macro eNB and increase the uplink interference among UEs, and is not beneficial to power saving of UEs. The method in the embodiments of the present application comprises: a macro eNB determining an uplink transmitting node used for receiving uplink information about a UE this time from a transmission node connected to the UE; determining the effective time of the uplink transmission node determined this time; and after the effective time of the uplink transmitting node determined this time has arrived, receiving the uplink information sent by the UE through the uplink transmitting node determined this time. Under a heterogeneous network, the embodiments (Continued)

of the present application can flexibly determine an appropriate uplink transmission node to transmit uplink information, thereby reducing the load of the Macro eNB, reducing the interference among various UEs, improving the system throughput, and saving the electric quantity of the UEs.

6 Claims, 4 Drawing Sheets

(51) Int. Cl.
    *H04W 36/22*     (2009.01)
    *H04W 84/04*     (2009.01)
    *H04W 36/04*     (2009.01)

(52) U.S. Cl.
    CPC ........ *H04W 72/048* (2013.01); *H04W 84/045* (2013.01); *Y02B 60/50* (2013.01)

(58) Field of Classification Search
    USPC ........................................................ 370/329
    See application file for complete search history.

(56) References Cited

FOREIGN PATENT DOCUMENTS

| | | |
|---|---:|---:|
| CN | 101925156 A | 12/2010 |
| CN | 102461030 A | 5/2012 |
| CN | 10271118 A | 10/2012 |
| CN | 102711186 A | 10/2012 |
| WO | 2011020211 A1 | 2/2011 |
| WO | 2011/035420 A1 | 3/2011 |
| WO | 2012/119626 A1 | 9/2012 |
| WO | 2012/137619 A1 | 10/2012 |

\* cited by examiner

METHOD, DEVICE AND SYSTEM FOR TRANSMITTING UPLINK INFORMATION

This application is a US National Stage of International Application No. PCT/CN2013/090598, filed on Dec. 26, 2013, designating the United States and claiming the benefit of Chinese Patent Application No. 201210581372.9, filed with the Chinese Patent Office on Dec. 27, 2012 and entitled "Method, device and system for transmitting uplink information", which is hereby incorporated by reference in its entirety.

FIELD

The present invention relates to the field of wireless communications and particularly to a method, device and system for transmitting uplink information.

BACKGROUND

There are significantly improved system peak rates required in a Long Term Evolution-Advanced (LTE-A) system up to 1 Gbps in the downlink and 500 Mbps in the uplink as compared with the Long Term Evolution (LTE) system; and also the LTE-A system is required to be well compatible with the LTE system, and there is a bandwidth up to 20 MHz in the LTE system. Carrier Aggregation (CA) has been introduced to the LTE-A system so as to accommodate the required improvement of the peak rates, compatibility with the LTE system, and full use of frequency resources.

For a User Equipment (UE) with a support of CA, resources of one or more cells can be aggregated concurrently for the UE, and the UE can transmit data concurrently in these cells. The number of cells aggregated for the UE is configured by a base station according to a service demand of the UE. In the Release 10 (R10)/Release11 (R11), each of the cells aggregated for the UE can include a pair of uplink/downlink carriers or only a downlink carrier, that is, the number of downlink carriers shall be more than or equal to the number of uplink carriers, but the number of uplink carriers shall not be more than the number of downlink carriers.

Cells with their carriers being aggregated are further categorized in the LTE-A system so that the cells configured for the UE can be categorized into a Primary Cell (PCell) and a Secondary Cell (SCell) dependent upon different functions of the respective cells aggregated for the UE. In the scenario where the carriers are aggregated, only one of the cells for each UE is defined as a Primary Cell, the Primary Cell is selected by the base station and configured to the UE in Radio Resource Control (RRC) signaling, and the Primary Cell is primarily responsible for carrying transmission of all the uplink control information of the carriers for the UE; and the cells aggregated for the UE other than the Primary Cell will be referred to as Secondary Cells, the Secondary Cells are configured by the base station and primarily responsible for transmitting traffic data of the UE.

Such a scenario where carriers are aggregated has been defined in the LTE R10 that there is a heterogeneous network including a macro eNB and local nodes, where the macro eNB provides underlying coverage, and the local nodes provide hotspot coverage. The local nodes include Remote Radio Heads (RRHs), repeaters, local eNBs, etc. In the scenario where the carriers are aggregated in the heterogeneous network, downlink data of the UE can be transmitted to the UE by only one transmitting node or can be transmitted to the UE concurrently by two transmitting nodes; and similarly uplink data of the UE can be transmitted to only one transmitting node or can be transmitted concurrently to two transmitting nodes. However from the perspective of a radio frequency design, it is relatively easy to receive data transmitted from two transmitting nodes concurrently in the downlink, but it may be relatively difficult to transmit data concurrently to two transmitting nodes in the uplink. At present there is generally only one transmitter for the UE in the uplink, that is, there is a support of only transmission of uplink data to a single transmitting node at a time.

For a UE with a support of only uplink transmission to a single node at a time, uplink transmission of the UE is generally active only with the PCell in the existing uplink transmission mechanism. In the heterogeneous network, the macro eNB provides a large coverage area, so a cell served by the macro eNB is typically selected as the PCell. The existing uplink transmission mechanism suffers from the drawbacks of an increased burden on the macro eNB, increased power consumption of the UE, increased uplink interference and a degraded throughout of the system.

In summary, the existing mechanism of uplink transmission by the UE may come with an increased burden on the macro eNB, increased uplink interference between UEs, and degraded power saving of the UE.

SUMMARY

Embodiments of the invention provide a method, device and system for transmitting uplink information so as to address the problems of an increased burden on the macro eNB, increased uplink interference between UEs, and degraded power saving of the UE in the existing mechanism of uplink transmission by the UE.

An embodiment of the invention provides a method for receiving uplink information, the method including:

determining, by a macro base station, from transmitting nodes connected with a User Equipment (UE) an uplink transmitting node for currently receiving uplink information of the UE;

determining, by the macro base station, an instance of time to enable the currently determined uplink transmitting node; and receiving, by the macro base station, the uplink information transmitted by the UE through the currently determined uplink transmitting node after the instance of time to enable the currently determined uplink transmitting node arrives.

With the embodiment of the invention, an appropriate uplink transmitting node can be determined flexibly to transmit uplink information in a heterogeneous network to thereby lower a burden on the macro base station, alleviate uplink interference between respective UEs, improve the throughput of the system, and save power of the UE.

Preferably before the macro base station determines the uplink transmitting node for currently receiving uplink information of the UE, the method further includes: determining, by the macro base station, that the UE supports uplink transmission to a single node at a time, according to obtained capability information of the UE.

Furthermore the macro base station may determine that the UE supports uplink transmission to a single node at a time, in the following operations: if the capability information of the UE carries first indication information for indicating the number of Radio Frequencies (RFs) included in the UE, and the first indication information indicates the number as 1, then the macro base station determines that the UE supports uplink transmission to a single node at a time;

if the capability information of the UE carries second indication information for indicating whether the UE supports Multiple Timing Advance (MTA), and the second indication information indicates that the UE does not support MTA, then the macro base station determines that the UE supports uplink transmission to a single node at a time; and if the capability information of the UE carries third indication information for indicating whether the UE supports uplink transmission to a single node at a time, and the third indication information indicates that the UE supports uplink transmission to a single node at a time, then the macro base station determines that the UE supports uplink transmission to a single node at a time.

Further to any one of the embodiments of the method above, preferably determining, by the macro base station, the uplink transmitting node for currently receiving the uplink information of the UE includes: selecting, by the macro base station, from the transmitting nodes connected with the UE a transmitting node satisfying a preset selection criterion as the currently determined uplink transmitting node; or determining, by the macro base station, a transmitting node serving a cell corresponding to identifier information transmitted by the UE in higher-layer signaling as the currently determined uplink transmitting node upon reception of the identifier information, wherein the identifier information includes identifier information of one or more cells corresponding to the uplink transmitting node selected by the UE for the UE; or determining, by the macro base station, the uplink transmitting node to currently receive the uplink information of the UE, according to a rule prescribed between the macro base station and the UE.

Furthermore the selection criterion may include one or more of the following criterions:

the macro base station determines distances between the UE and the respective transmitting nodes according to current location information of the UE and selects a transmitting node with the distance being the shortest or no more than a preset distance threshold as the currently determined uplink transmitting node;

the macro base station selects a transmitting node corresponding to a cell with a path loss being the lowest or no more than a preset path loss threshold as the currently determined uplink transmitting node according to path loss information of the UE in respective cells;

the macro base station selects a transmitting node corresponding to a cell with a value of Reference Signal Received Quality (RSRQ) being the highest or more than a preset RSRQ threshold as the currently determined uplink transmitting node according to reference signal reception conditions of the UE in respective cells;

the macro base station selects a transmitting node corresponding to a cell with a value of Reference Signal Received Power (RSRP) being the highest or more than a preset RSRP threshold as the currently determined uplink transmitting node according to reference signal reception conditions of the UE in respective cells;

the macro base station selects a transmitting node corresponding to a cell with a value of Channel Quality Indicator (CQI) being the highest or more than a preset CQI threshold as the currently determined uplink transmitting node according to reference signal reception conditions of the UE in respective cells; and the macro base station selects a transmitting node corresponding to a cell with a value of Sounding Reference Signal (SRS) reception quality being the highest or more than a preset SRS threshold as the currently determined uplink transmitting node according to reception qualities of the SRSs transmitted by the UE in respective cells.

Furthermore after the macro base station selects the transmitting node satisfying the preset selection criterion as the currently determined uplink transmitting node, and before the macro base station determines the instance of time to enable the currently determined uplink transmitting node, the method may further include: signaling, by the macro base station, the currently determined uplink transmitting node to the UE upon determining that the currently determined uplink transmitting node is different from a lastly determined uplink transmitting node, wherein the signaling carries the identifier information of the one or more cells corresponding to the currently determined uplink transmitting node.

Preferably the signaling includes Radio Resource Control (RRC) signaling, Media Access Control (MAC) signaling or physical layer signaling.

If the signaling is the physical layer signaling, then determining, by the macro base station, the uplink transmitting node to currently receive the uplink information of the UE may include: at a specified instance of time, if there is a demand for uplink transmission over any of component carriers aggregated for the UE, then determining, by the macro base station, a transmitting node serving the component carrier, over which there is the demand for uplink transmission, as the currently determined uplink transmitting node.

Preferably the identifier information of the cell is an index number of the cell; or the identifier information of the cell is a combination of a Downlink (DL) frequency and a Physical Cell Identifier (PCI); or the identifier information of the cell is an E-UTRAN Cell Global Identifier (ECGI).

Preferably the prescribed rule includes such a rule that a different transmitting node is selected in each preset change cycle as an uplink transmitting node determined each time.

Furthermore the change cycles and offsets of different UEs are configured by the macro base station or prescribed between the macro base station and the respective UEs.

Preferably determining, by the macro base station, the instance of time to enable the currently determined uplink transmitting node includes: determining, by the macro base station, the instance of time to enable the currently determined uplink transmitting node, according to an instance of time when the macro base station transmits the signaling, and an enabling instance of time prescribed between the macro base station and the UE; or determining, by the macro base station, an instance of time when the macro base station receives a Hybrid Automatic Repeat Request (HARQ) Acknowledgement (ACK) feedback or an RRC response message transmitted by the UE for the signaling as the instance of time to enable the currently determined uplink transmitting node; or if the signaling is physical layer signaling, then determining, by the macro base station, a sub-frame carrying the physical layer signaling as the instance of time to enable the currently determined uplink transmitting node; or determining, by the macro base station, the instance of time to enable the currently determined uplink transmitting node, according to an instance of time when the UE transmits the higher-layer signaling, and an enabling instance of time prescribed between the macro base station and the UE; or determining, by the macro base station, the instance of time to enable the currently determined uplink transmitting node, according to a current System Frame Number (SFN), sub-frame number and offset, and a change cycle corresponding to the uplink transmitting node.

Preferably if the macro base station determines the instance of time to enable the currently determined uplink transmitting node, according to the instance of time when the signaling is transmitted, and the enabling instance of time prescribed between the macro base station and the UE, then after the macro base station signals the currently determined uplink transmitting node to the UE and before the instance of time to enable the currently determined uplink transmitting node arrives, the method further includes: receiving, by the macro base station, the uplink information transmitted by the UE through a lastly determined uplink transmitting node; or terminating, by the macro base station, uplink/downlink scheduling for the UE.

Preferably if the macro base station determines the instance of time when the macro base station receives the HARQ ACK feedback or the RRC response message transmitted by the UE for the signaling as the instance of time to enable the currently determined uplink transmitting node, then after the macro base station signals the currently determined uplink transmitting node to the UE and before the instance of time to enable the currently determined uplink transmitting node arrives, the method further includes: detecting, by the macro base station, the uplink information transmitted by the UE respectively through a lastly determined uplink transmitting node and the currently determined uplink transmitting node; or terminating, by the macro base station, uplink/downlink scheduling for the UE.

An embodiment of the invention provides a method for transmitting uplink information, the method including:

determining, by a User Equipment (UE), from transmitting nodes connected therewith an uplink transmitting node to which uplink information of the UE needs to be transmitted currently;

determining, by the UE, an instance of time to enable the currently determined uplink transmitting node; and transmitting, by the UE, the uplink information to the currently determined uplink transmitting node after the instance of time to enable the currently determined uplink transmitting node arrives.

With the embodiment of the invention, an appropriate uplink transmitting node can be determined flexibly to transmit uplink information in a heterogeneous network to thereby lower a burden on the macro base station, alleviate uplink interference between respective UEs, improve the throughput of the system, and save power of the UE.

Preferably determining, by the UE, the uplink transmitting node to which the uplink information of the UE needs to be transmitted includes:

selecting, by the UE, from the transmitting nodes connected therewith a transmitting node satisfying a preset determination criterion as the currently determined uplink transmitting node; or determining, by the UE, a transmitting node serving a cell corresponding to identifier information signaled by a macro base station as the currently determined uplink transmitting node upon reception of the identifier information, wherein the identifier information includes identifier information of one or more cells corresponding to the uplink transmitting node selected by the macro base station for the UE; or determining, by the UE, the uplink transmitting node to which the uplink information of the UE needs to be transmitted currently, according to a rule prescribed between the UE and the macro base station.

Furthermore the determination criterion may include one or more of the following criterions:

the UE selects an uplink transmitting node corresponding to a serving cell with a value of RSRP being the highest or more than a preset RSRP threshold as the currently determined uplink transmitting node according to measurement results of the UE for respective serving cells;

the UE selects an uplink transmitting node corresponding to a serving cell with a value of RSRQ being the highest or more than a preset RSRQ threshold as the currently determined uplink transmitting node according to measurement results of the UE for respective serving cells;

the UE selects an uplink transmitting node corresponding to a serving cell with a value of CQI being the highest or more than a preset CQI threshold as the currently determined uplink transmitting node according to measurement results of the UE for respective serving cells;

the UE selects an uplink transmitting node corresponding to a serving cell with a value of path loss being the lowest as the currently determined uplink transmitting node according to measurement results of the UE for respective serving cells; and the UE determines distances between the UE and the respective transmitting nodes according to current location information of the UE and selects a transmitting node with the distance being the shortest as the currently determined uplink transmitting node.

Preferably after the UE selects the transmitting node satisfying the preset determination criterion as the currently determined uplink transmitting node and before the UE determines the instance of time to enable the currently determined uplink transmitting node, the method further includes: signaling, by the UE, the currently determined uplink transmitting node to the macro base station in higher-layer signaling upon determining that the currently determined uplink transmitting node is different from a lastly determined uplink transmitting node, wherein the higher-layer signaling carries the identifier information of the one or more cells corresponding to the currently determined uplink transmitting node.

Furthermore the identifier information is an index number of the cell; or the identifier information is a combination of a downlink (DL) frequency and a Physical Cell Identifier (PCI); or the identifier information is an ECGI.

Preferably if the signaling transmitted by the macro base station is physical layer signaling carrying uplink scheduling information, then determining, by the UE, the uplink transmitting node to which the uplink information of the UE needs to be transmitted currently includes: determining, by the UE, a transmitting node serving a cell corresponding to the uplink scheduling information carried in the physical layer signaling as the uplink transmitting node to which the uplink information of the UE needs to be transmitted currently.

Preferably the prescribed rule includes such a rule that a different transmitting node is selected in each preset change cycle as an uplink transmitting node determined each time.

Furthermore the change cycles and offsets of different UEs are configured by the macro base station or prescribed between the macro base station and the respective UEs.

Preferably determining, by the UE, the instance of time to enable the currently determined uplink transmitting node includes: determining, by the UE, the instance of time to enable the currently determined uplink transmitting node, according to an instance of time when the UE transmits the higher-layer signaling, and an enabling instance of time prescribed between the UE and the macro base station; or determining, by the UE, the instance of time to enable the currently determined uplink transmitting node, according to an instance of time when the macro base station transmits the signaling, and an enabling instance of time prescribed between the UE and the macro base station; or determining, by the UE, an instance of time when the UE receives the identifier information transmitted by the macro base station as the instance of time to enable the currently determined uplink transmitting node; or if the signaling transmitted by the macro base station is physical layer signaling, then determining, by the UE, a sub-frame carrying the physical layer signaling as the instance of time to enable the currently determined uplink transmitting node; or determining, by the UE, the instance of time to enable the currently determined uplink transmitting node, according to a current System Frame Number (SFN), sub-frame number and offset, and a change cycle corresponding to the uplink transmitting node.

Further to any one of the embodiments of the method above, preferably before the UE determines the uplink transmitting node to currently transmit the uplink information and before the instance of time to enable the currently determined uplink transmitting node arrives, the method further includes: transmitting, by the UE, the uplink information to a lastly determined uplink transmitting node.

Further to any one of the embodiments of the method above, preferably transmitting, by the UE, the uplink information to the currently determined uplink transmitting node includes: transmitting, by the UE, the uplink information over an uplink carrier corresponding to the currently determined uplink transmitting node.

Furthermore if a plurality of component carriers among carriers aggregated for the UE are configured with Physical Uplink Control Channels (PUCCHs), then transmitting, by the UE, the uplink information over the uplink carrier corresponding to the currently determined uplink transmitting node includes: transmitting, by the UE, the uplink information over a component carrier served by the currently determined uplink transmitting node and configured with a PUCCH.

Further to any one of the embodiments of the method above, preferably after the UE determines the instance of time to enable the currently determined uplink transmitting node, the method further includes one or more of the steps of:

deleting, by the UE, an uplink scheduling configuration, stored by the UE, corresponding to a lastly determined uplink transmitting node;

storing, by the UE, a value of Timing Advance (TA) of a cell or a Timing Advance Group (TAG) corresponding to the lastly determined uplink transmitting node;

stopping, by the UE, an SRS, a Dedicated Scheduling Request (DSR) and a CQI from being transmitted to the lastly determined uplink transmitting node;

determining, by the UE, a value of TA of a cell corresponding to the currently determined uplink transmitting node; and deleting, by the UE, a HARQ buffer, stored by the UE, of the cell corresponding to the lastly determined uplink transmitting node.

Furthermore determining, by the UE, the value of TA of the cell corresponding to the currently determined uplink transmitting node includes: determining, by the UE, the value of TA of the cell corresponding to the currently determined uplink transmitting node according to a received Timing Advance Command (TAC) Media Access Control (MAC) Control Element (CE), and the value of TA, stored by the UE, of the cell or the TAG corresponding to the lastly determined uplink transmitting node after the uplink transmitting node to currently transmit the uplink information is determined; or obtaining, by the UE, the value of TA of the cell corresponding to the currently determined uplink transmitting node in a Random Access (RA) procedure after the uplink transmitting node to currently transmit the uplink information is determined.

An embodiment of the invention provides a macro base station including:

a first determining module configured to determine from transmitting nodes connected with a User Equipment (UE) an uplink transmitting node for currently receiving uplink information of the UE;

a second determining module configured to determine an instance of time to enable the currently determined uplink transmitting node; and a receiving module configured to receive the uplink information transmitted by the UE through the currently determined uplink transmitting node after the instance of time to enable the currently determined uplink transmitting node arrives.

With the embodiment of the invention, an appropriate uplink transmitting node can be determined flexibly to transmit uplink information in a heterogeneous network to thereby lower a burden on the macro base station, alleviate uplink interference between respective UEs, improve the throughput of the system, and save power of the UE.

Preferably the first determining module is configured: to select from the transmitting nodes connected with the UE a transmitting node satisfying a preset selection criterion as the currently determined uplink transmitting node; or to determine a transmitting node serving a cell corresponding to identifier information transmitted by the UE in higher-layer signaling as the currently determined uplink transmitting node upon reception of the identifier information, wherein the identifier information includes identifier information of one or more cells corresponding to the uplink transmitting node selected by the UE for the UE; or to determine the uplink transmitting node for currently receiving the uplink information of the UE, according to a rule prescribed between the macro base station and the UE.

Preferably the first determining module is further configured: to signal the currently determined uplink transmitting node to the UE if it is determined that the currently determined uplink transmitting node is different from a lastly determined uplink transmitting node after the transmitting node satisfying the preset selection criterion is selected as the currently determined uplink transmitting node and before the instance of time to enable the currently determined uplink transmitting node is determined, wherein the signaling carries the identifier information of the one or more cells corresponding to the currently determined uplink transmitting node.

Preferably the second determining module is configured: to determine the instance of time to enable the currently determined uplink transmitting node, according to an instance of time when the macro base station transmits the signaling, and an enabling instance of time prescribed between the macro base station and the UE; or to determine an instance of time when the macro base station receives an HARQ ACK feedback or an RRC response message transmitted by the UE for the signaling as the instance of time to enable the currently determined uplink transmitting node; or if the signaling is physical layer signaling, to determine a sub-frame carrying the physical layer signaling as the instance of time to enable the currently determined uplink transmitting node; or to determine the instance of time to enable the currently determined uplink transmitting node, according to an instance of time when the UE transmits the higher-layer signaling, and an enabling instance of time prescribed between the macro base station and the UE; or to determine the instance of time to enable the currently determined uplink transmitting node, according to a current System Frame Number (SFN), sub-frame number and offset, and a change cycle corresponding to each uplink transmitting node.

Furthermore if the second determining module determines the instance of time to enable the currently determined uplink transmitting node, according to the instance of time when the macro base station transmits the signaling, and the enabling instance of time prescribed between the macro base station and the UE, then the receiving module is configured to receive the uplink information transmitted by the UE through a lastly determined uplink transmitting node; or to terminate uplink/downlink scheduling for the UE, after the currently determined uplink transmitting node is signaled to the UE and before the instance of time to enable the currently determined uplink transmitting node arrives; and if the second determining module determines the instance of time when the macro base station receives the HARQ ACK feedback or the RRC response message transmitted by the UE for the signaling as the instance of time to enable the currently determined uplink transmitting node, then the receiving module is configured to detect the uplink information transmitted by the UE respectively through a lastly determined uplink transmitting node and the currently determined uplink transmitting node; or to terminate uplink/downlink scheduling for the UE, after the currently determined uplink transmitting node is signaled to the UE and before the instance of time to enable the currently determined uplink transmitting node arrives.

Based upon the same inventive idea as the method, an embodiment of the invention provides another macro base station including a processor and a radio frequency device wherein:

the processor is configured to determine from transmitting nodes connected with a User Equipment (UE) an uplink transmitting node for currently receiving uplink information of the UE; and to determine an instance of time to enable the currently determined uplink transmitting node; and the radio frequency device is configured to receive the uplink information transmitted by the UE through the currently determined uplink transmitting node after the instance of time to enable the currently determined uplink transmitting node arrives.

With the embodiment of the invention, an appropriate uplink transmitting node can be determined flexibly to transmit uplink information in a heterogeneous network to thereby lower a burden on the macro base station, alleviate uplink interference between respective UEs, improve the throughput of the system, and save power of the UE.

An embodiment of the invention provides a UE including:

a first processing module configured to determine from transmitting nodes connected with the UE an uplink transmitting node to which uplink information of the UE needs to be transmitted currently;

a second processing module configured to determine an instance of time to enable the currently determined uplink transmitting node; and a transmitting module configured to transmit the uplink information to the currently determined uplink transmitting node after the instance of time to enable the currently determined uplink transmitting node arrives.

With the embodiment of the invention, an appropriate uplink transmitting node can be determined flexibly to transmit uplink information in a heterogeneous network to thereby lower a burden on the macro base station, alleviate uplink interference between respective UEs, improve the throughput of the system, and save power of the UE.

Preferably the first processing module is configured: to select from the transmitting nodes connected with the UE a transmitting node satisfying a preset determination criterion as the currently determined uplink transmitting node; or to determine a transmitting node serving a cell corresponding to identifier information signaled by a macro base station as the currently determined uplink transmitting node upon reception of the identifier information, wherein the identifier information includes identifier information of one or more cells corresponding to the uplink transmitting node selected by the macro base station for the UE; or to determine the uplink transmitting node to currently receive the uplink information of the UE, according to a rule prescribed between the UE and the macro base station.

Preferably the first processing module is further configured to signal the currently determined uplink transmitting node to the macro base station in higher-layer signaling if it is determined that the currently determined uplink transmitting node is different from a lastly determined uplink transmitting node after the transmitting node satisfying the preset selection criterion is selected as the currently determined uplink transmitting node and before the instance of time to enable the currently determined uplink transmitting node is determined, wherein the higher-layer signaling carries the identifier information of the one or more cells corresponding to the currently determined uplink transmitting node.

Preferably the second processing module is configured to determine the instance of time to enable the currently determined uplink transmitting node, according to an instance of time when the UE transmits the higher-layer signaling, and an enabling instance of time prescribed between the UE and the macro base station; or to determine the instance of time to enable the currently determined uplink transmitting node, according to an instance of time when the macro base station transmits the signaling, and an enabling instance of time prescribed between the UE and the macro base station; or to determine an instance of time when the UE receives the identifier information transmitted by the macro base station as the instance of time to enable the currently determined uplink transmitting node; or if the signaling transmitted by the macro base station is physical layer signaling, to determine a sub-frame carrying the physical layer signaling as the instance of time to enable the currently determined uplink transmitting node; or to determine the instance of time to enable the currently determined uplink transmitting node, according to a current System Frame Number (SFN), sub-frame number and offset, and a change cycle corresponding to the uplink transmitting node.

Preferably the transmitting module is further configured to transmit the uplink information to a lastly determined uplink transmitting node before the first determining module determines the uplink transmitting node to currently transmit the uplink information and before the enabling instance of time determined by the second determining module arrives.

Preferably the second processing module is further configured to perform one or more of the following steps after the instance of time to enabling the currently determined uplink transmitting node is determined: to delete an uplink scheduling configuration, stored by the UE, corresponding to a lastly determined uplink transmitting node; to store a value of TA of a cell or a TAG corresponding to the lastly determined uplink transmitting node; to stop an SRS, a DSR and a CQI from being transmitted to the lastly determined uplink transmitting node; to determine a value of TA of a cell corresponding to the currently determined uplink transmitting node; and to delete an HARQ buffer, stored by the UE, of one or more cells corresponding to the lastly determined uplink transmitting node.

An embodiment of the invention provides another UE including a processor and a radio frequency device, wherein:

the processor is configured to determine from transmitting nodes connected with the UE an uplink transmitting node to which uplink information of the UE needs to be transmitted currently; and to determine an instance of time to enable the currently determined uplink transmitting node; and the radio frequency device is configured to transmit the uplink information to the currently determined uplink transmitting node after the instance of time to enable the currently determined uplink transmitting node arrives.

With the embodiment of the invention, an appropriate uplink transmitting node can be determined flexibly to transmit uplink information in a heterogeneous network to thereby lower a burden on the macro base station, alleviate uplink interference between respective UEs, improve the throughput of the system, and save power of the UE.

An embodiment of the invention provides a communicating system including:

a macro base station configured to determine from transmitting nodes connected with a User Equipment (UE) an uplink transmitting node for currently receiving uplink information of the UE; to determine an instance of time to enable the currently determined uplink transmitting node; and to receive the uplink information transmitted by the UE through the currently determined uplink transmitting node after the instance of time to enable the currently determined uplink transmitting node arrives; and the UE configured to determine from the transmitting nodes connected with the UE the uplink transmitting node to which uplink information of the UE needs to be transmitted currently; to determine the instance of time to enable the currently determined uplink transmitting node; and to transmit the uplink information to the currently determined uplink transmitting node after the instance of time to enable the currently determined uplink transmitting node arrives.

With the embodiment of the invention, an appropriate uplink transmitting node can be determined flexibly to transmit uplink information in a heterogeneous network to thereby lower a burden on the macro base station, alleviate uplink interference between respective UEs, improve the throughput of the system, and save power of the UE.

DETAILED DESCRIPTION OF THE EMBODIMENTS

With the embodiments of the invention, an appropriate uplink transmitting node can be determined flexibly to which uplink information is transmitted in a heterogeneous network to thereby lower a burden on a macro eNB, alleviate uplink interference between respective UEs, improve the throughput of a system, and save power of a UE.

The embodiments of the invention will be described below in details with reference to the drawings.

The uplink information in the embodiments of the invention includes but will not be limited to one or more of the following information:

An SRS, a DSR and a CQI.

The transmitting node in the embodiments of the invention includes but will not be limited to one or more of the following nodes:

A pico (low power) eNB, a femto (home) eNB, an RRH, a repeater, a Relay Node (RN), and a macro eNB.

Figure 1:
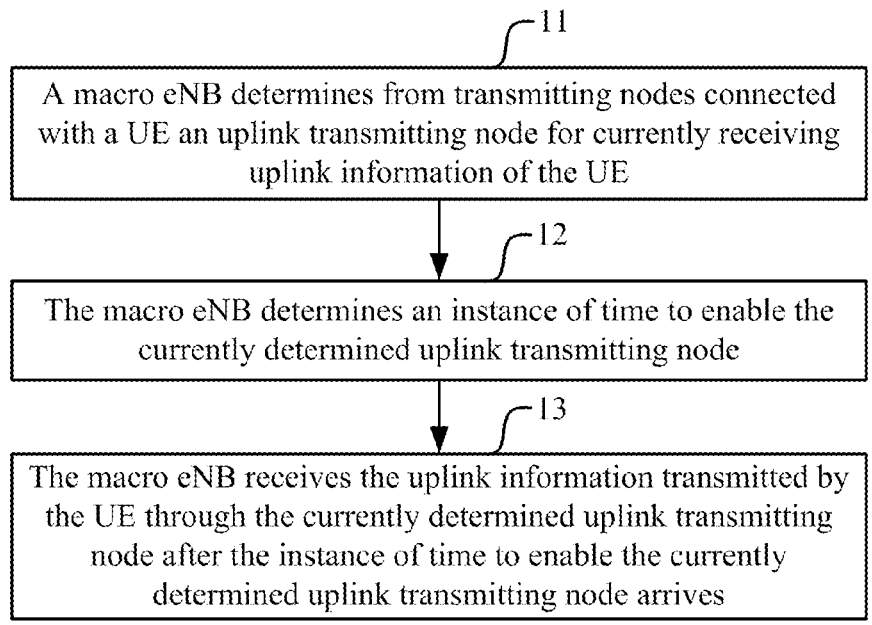
FIG. 1 illustrates a schematic flow chart of a method for receiving uplink information according to an embodiment of the invention.

An embodiment of the invention provides a method for receiving uplink information, which is applicable to a scenario where a UE supports only uplink transmission to a single node, and referring to FIG. 1, the method includes the following operations:

Step 11. A macro eNB determines from transmitting nodes connected with a UE an uplink transmitting node for currently receiving uplink information of the UE;

Step 12. The macro eNB determines an instance of time to enable the currently determined uplink transmitting node; and Step 13. The macro eNB receives the uplink information transmitted by the UE through the currently determined uplink transmitting node after the instance of time to enable the currently determined uplink transmitting node arrives.

In the embodiment of the invention, before the operation 11, the method further includes:

The macro eNB determines that the UE supports uplink transmission to a single node at a time, according to obtained capability information of the UE.

When the UE enters the RRC CONNECTED state from the RRC IDLE state, the macro eNB needs to obtain the capability information of the UE, including UE radio capability information and UE network capability information. The UE radio capability information includes power levels, frequency bandwidths, etc., supported by the UE, and the UE network capability information includes a support capability of the UE for a security algorithm, etc.

Furthermore the macro eNB transmits a capability query request to the UE via an air interface; and accordingly the UE reports the capability information of the UE to the macro eNB upon reception of the capability query request transmitted by the macro eNB; or the macro eNB transmits a capability query request to a Mobile Management Entity (MME); and accordingly the MME returns the capability information of the UE to the macro eNB upon reception of the capability query request transmitted by the macro eNB.

Furthermore the macro eNB can determine that the UE supports uplink transmission to a single node at a time, in the following three approaches without any limitation thereto:

In a first approach, if the capability information of the UE carries first indication information for indicating the number of RFs included in the UE, and the first indication information indicates the number as 1, then the macro eNB determines that the UE supports uplink transmission to a single node at a time;

In a second approach, if the capability information of the UE carries second indication information for indicating whether the UE supports MTA, and the second indication information indicates that the UE does not supports MTA, then the macro eNB determines that the UE supports uplink transmission to a single node at a time; and In a third approach, if the capability information of the UE carries third indication information for indicating whether the UE supports uplink transmission to a single node at a time, and the third indication information indicates that the UE supports uplink transmission to a single node at a time, then the macro eNB determines that the UE supports uplink transmission to a single node at a time.

The third indication information can be 1-bit data, for example, if the third indication information is "1", then it indicates that the UE supports uplink transmission to a single node at a time; and if the third indication information is "0", then it indicates that the UE does not support uplink transmission to a single node at a time.

In this embodiment, the operation 11 can be further performed in the following three approaches without any limitation thereto:

In an approach A1, the macro eNB selects an appropriate transmitting node for the UE as the currently determined uplink transmitting node; and the operation 11 includes:

The macro eNB selects from the transmitting nodes connected with the UE a transmitting node satisfying a preset selection criterion as the currently determined uplink transmitting node.

Furthermore the selection criterion can include but will not be limited to one or more of the following criterions:

The macro eNB determines distances between the UE and the respective transmitting nodes according to current location information of the UE and selects a transmitting node with the distance being the shortest or no more than a preset distance threshold as the currently determined uplink transmitting node, and the distance threshold is an empirical value and can be determined as needed in practice;

The macro eNB selects a transmitting node corresponding to a cell with a path loss being the lowest or no more than a preset path loss threshold as the currently determined uplink transmitting node according to path loss information of the UE in respective cells, and the path loss threshold is an empirical value and can be determined as needed in practice;

The macro eNB selects a transmitting node corresponding to a cell with a value of Reference Signal Received Power (RSRP) being the highest or more than a preset RSRP threshold as the currently determined uplink transmitting node according to reference signal reception conditions of the UE in respective cells, and the RSRP threshold is an empirical value and can be determined as needed in practice;

The macro eNB selects a transmitting node corresponding to a cell with a value of Reference Signal Received Quality (RSRQ) being the highest or more than a preset RSRQ threshold as the currently determined uplink transmitting node according to reference signal reception conditions of the UE in respective cells, and the RSRQ threshold is an empirical value and can be determined as needed in practice;

The macro eNB selects a transmitting node corresponding to a cell with a value of CQI being the highest or more than a preset CQI threshold as the currently determined uplink transmitting node according to reference signal reception conditions of the UE in respective cells, and the CQI threshold is an empirical value and can be determined as needed in practice; and The macro eNB selects a transmitting node corresponding to a cell with a value of SRS reception quality being the highest or more than a preset SRS threshold as the currently determined uplink transmitting node according to reception qualities of the SRSs transmitted by the UE in respective cells, and the SRS threshold is an empirical value and can be determined as needed in practice.

Furthermore in this approach, after the operation 11 and the before the operation 12, the method according to the embodiment of the invention further includes:

The macro eNB signals the currently determined uplink transmitting node to the UE through signaling upon determining that the currently determined uplink transmitting node is different from a lastly determined uplink transmitting node, and the signaling carries the identifier information of the one or more cells corresponding to the currently determined uplink transmitting node.

Preferably the signaling transmitted by the macro eNB includes Radio Resource Control (RRC) signaling, Media Access Control (MAC) signaling or physical layer signaling, and the physical layer signaling includes a Physical Downlink Control Channel (PDCCH), an Evolved-PDCCH (E-PDCCH), or a Relay-PDCCH (R-PDCCH), etc.

Preferably the identifier information of the cell can be an index number of the cell or can be a combination of a downlink (DL) frequency and a Physical Cell Identifier (PCI) or can be an E-UTRAN Cell Global Identifier (ECGI).

Furthermore if the macro eNB signals the currently determined uplink transmitting node to the UE in MAC signaling, then a dedicated Logical Channel Identifier (LCID) also needs to be introduced to the MAC signaling to indicate that the MAC signaling is used for indicating to the UE a transmitting node or a cell for uplink transmission.

Furthermore if the macro eNB signals the currently determined uplink transmitting node to the UE in physical layer signaling, then there are two approaches to indicate the currently determined uplink transmitting node explicitly and implicitly:

In a first approach, the currently determined uplink transmitting node is indicated explicitly as follows:

The macro eNB carries the identifier information of the one or more cells of the currently determined uplink transmitting node in the physical layer signaling.

In a second approach, the currently determined uplink transmitting node is indicated implicitly as follows:

At a specified instance of time, if there is a demand for uplink transmission over any of component carriers aggregated for the UE, then the macro eNB determines a transmitting node serving the component carrier, over which there is the demand for uplink transmission, as the currently determined uplink transmitting node.

For example, there are two UL Component Carriers (CCs), i.e., CC1 and CC2, aggregated for the UE; and if there is a demand for uplink transmission (e.g., a Physical Uplink Shared Channel (PUSCH), a Physical Uplink Control Channel (PUCCH) or an SRS) over the CC1 at an instance of time T1, then a transmitting node corresponding to the CC1 is selected as the currently determined uplink transmitting node.

Furthermore when the currently determined uplink transmitting node is indicated implicitly, the macro eNB needs to ensure that there is no confliction in time between transmissions of PUCCHs, PUSCHs and SRSs in a plurality of cells corresponding to different uplink transmitting nodes.

Furthermore in this approach, if the signaling transmitted by the macro eNB is RRC signaling, then the macro eNB can determine the instance of time to enable the currently determined uplink transmitting node in the operation 12 in one of the following approaches without any limitation thereto:

In a first approach, the macro eNB determines the instance of time to enable the currently determined uplink transmitting node, according to an instance of time when the signaling is transmitted, and an enabling instance of time prescribed between the macro eNB and the UE;

Furthermore after the macro eNB signals the currently determined uplink transmitting node to the UE and before the preset enabling instance of time arrives, the method according to the embodiment of the invention further includes:

The macro eNB receives the uplink information transmitted by the UE through the lastly determined uplink transmitting node; or the macro eNB terminates uplink/downlink scheduling for the UE (except a UL grant in which an RRC response message is transmitted).

Accordingly the UE transmits the uplink information to the lastly determined uplink transmitting node after the UE receives the identifier information, of the currently determined uplink transmitting node, transmitted by the macro eNB and before the preset instance of time arrives.

In a second approach, the macro eNB determines an instance of time when the macro eNB receives an HARQ ACK feedback or an RRC response message transmitted by the UE for the signaling as the instance of time to enable the currently determined uplink transmitting node;

Furthermore the macro eNB determines the instance of time to enable the currently determined uplink transmitting node as follows:

The macro eNB determines that the instance of time to enable the currently determined uplink transmitting node arrives, upon reception of the RRC response message on the currently determined uplink transmitting node.

Furthermore after the macro eNB signals the currently determined uplink transmitting node to the UE and before the preset enabling instance of time arrives, the method according to the embodiment of the invention further includes:

The macro eNB detects the uplink information transmitted by the UE respectively through the lastly determined uplink transmitting node and the currently determined uplink transmitting node; or the macro eNB terminates uplink/downlink scheduling for the UE (except a UL grant in which the RRC response message is transmitted).

Accordingly the UE transmits the uplink information to the lastly determined uplink transmitting node before the UE receives the identifier information, of the currently determined uplink transmitting node, transmitted by the macro eNB; and transmits the uplink information to the currently determined uplink transmitting node after the UE receives the identifier information, of the currently determined uplink transmitting node, transmitted by the macro eNB.

Furthermore in this approach, if the signaling transmitted by the macro eNB is MAC signaling, then the macro eNB can determine the instance of time to enable the currently determined uplink transmitting node in the operation 12 in one of the following approaches without any limitation thereto:

In a first approach, the macro eNB determines the instance of time to enable the currently determined uplink transmitting node, according to an instance of time when the signaling is transmitted, and an enabling instance of time prescribed between the macro eNB and the UE;

Furthermore after the macro eNB signals the currently determined uplink transmitting node to the UE and before the preset enabling instance of time arrives, the method according to the embodiment of the invention further includes:

The macro eNB receives the uplink information transmitted by the UE through the lastly determined uplink transmitting node; or the macro eNB terminates uplink/downlink scheduling for the UE.

Accordingly the UE transmits the uplink information to the lastly determined uplink transmitting node after the UE receives the identifier information, of the currently determined uplink transmitting node, transmitted by the macro eNB and before the preset instance of time arrives.

In a second approach, the macro eNB determines an instance of time when the macro eNB receives an HARQ ACK feedback or an RRC response message transmitted by the UE for the signaling as the instance of time to enable the currently determined uplink transmitting node;

Furthermore after the macro eNB signals the currently determined uplink transmitting node to the UE and before the instance of time to enable the currently determined uplink transmitting node arrives, the method according to the embodiment of the invention further includes:

The macro eNB detects the uplink information transmitted by the UE respectively through the lastly determined uplink transmitting node and the currently determined uplink transmitting node; or the macro eNB terminates uplink/downlink scheduling for the UE.

Accordingly the UE transmits the uplink information to the lastly determined uplink transmitting node before the UE receives the identifier information, of the currently determined uplink transmitting node, transmitted by the macro eNB; and transmits the uplink information to the currently determined uplink transmitting node after the UE receives the identifier information, of the currently determined uplink transmitting node, transmitted by the macro eNB.

Furthermore in this approach, if the signaling transmitted by the macro eNB is physical layer signaling, then the macro eNB can determine the instance of time to enable the currently determined uplink transmitting node in the operation 12 in the following approach without any limitation thereto:

The macro eNB determines a sub-frame carrying the physical layer signaling as the instance of time to enable the currently determined uplink transmitting node, that is, the current sub-frame is enabled.

It shall be noted that in order to avoid inconsistent understanding between the macro eNB and the UE due to a loss of the physical layer signaling, the macro eNB receives the uplink information concurrently through the currently determined uplink transmitting node and the lastly determined uplink transmitting node before the macro eNB receives an ACK feedback.

In an approach B1, the UE selects an appropriate transmitting node for itself as the currently determined uplink transmitting node, and here the step 11 further includes:

The macro eNB determines a transmitting node serving a cell corresponding to identifier information transmitted by the UE in higher-layer signaling as the currently determined uplink transmitting node upon reception of the identifier information, and the identifier information includes identifier information of one or more cells corresponding to the uplink transmitting node selected by the UE for the UE itself.

Preferably the identifier information of the cell can be an index number of the cell or can be a combination of a downlink frequency and a PCI or can be an ECGI.

Furthermore in this approach, if the higher-layer signaling transmitted by the UE is RRC signaling, then the macro eNB determines the instance of time to enable the currently determined uplink transmitting node in the operation 12 particularly as follows:

The macro eNB determines the instance of time to enable the currently determined uplink transmitting node, according to an instance of time when the UE transmits the higher-layer signaling, and an enabling instance of time prescribed between the macro eNB and the UE.

Furthermore after the macro eNB receives the identifier information, of the currently determined uplink transmitting node, transmitted by the UE and before the instance of time to enable the currently determined uplink transmitting node arrives, the method according to the embodiment of the invention further includes:

The macro eNB receives the uplink information transmitted by the UE through the lastly determined uplink transmitting node; or the macro eNB terminates uplink/downlink scheduling for the UE.

Accordingly the UE transmits the uplink information to the lastly determined uplink transmitting node after the UE transmits the identifier information of the currently determined uplink transmitting node to the macro eNB and before the preset instance of time arrives.

Furthermore in this approach, if the higher-layer signaling transmitted by the UE is MAC signaling, then the macro eNB determines the instance of time to enable the currently determined uplink transmitting node in the operation 12 particularly as follows:

The macro eNB determines the instance of time to enable the currently determined uplink transmitting node, according to an instance of time when the UE transmits the higher-layer signaling, and an enabling instance of time prescribed between the macro eNB and the UE.

Furthermore after the macro eNB receives the identifier information, of the currently determined uplink transmitting node, transmitted by the UE and before the instance of time to enable the currently determined uplink transmitting node arrives, the method according to the embodiment of the invention further includes:

The macro eNB receives the uplink information transmitted by the UE through the lastly determined uplink transmitting node; or the macro eNB terminates uplink/downlink scheduling for the UE.

Accordingly the UE transmits the uplink information to the lastly determined uplink transmitting node after the UE transmits the identifier information of the currently determined uplink transmitting node to the macro eNB and before the preset instance of time arrives.

In an approach C1, the macro eNB determines the uplink transmitting node for currently receiving the uplink information, according to a rule prescribed between the macro eNB and the UE;

The prescribed rule in the embodiment of the invention can include but will not be limited to such a rule that a different transmitting node is selected in each preset change cycle as an uplink transmitting node determined each time.

The change cycles and offsets of the different UEs are configured by the macro eNB or prescribed between the macro eNB and the respective UEs.

Furthermore the macro eNB determines the instance of time to enable the currently determined uplink transmitting node in the operation 12 particularly as follows:

The macro eNB determines the instance of time to enable the currently determined uplink transmitting node, according to a current System Frame Number (SFN), sub-frame number and offset, and a change cycle corresponding to each uplink transmitting node.

The change cycle corresponding to each uplink transmitting node may be the same or may be different.

For example, the macro eNB determines an instance of time when the current SFN and sub-frame number satisfy Equation 1 as the instance of time to enable the currently determined uplink transmitting node, that is, the uplink transmitting node is switched at that instance of time:

$$[(SFN*10)+\text{sub-frame number}]\,\text{modulo}\,(Cycle)=(\text{Offset})\,\text{modulo}\,(Cycle) \quad \text{Equation 1;}$$

(A) modulo (B) represents a modular operation of A on B.

Figure 2:
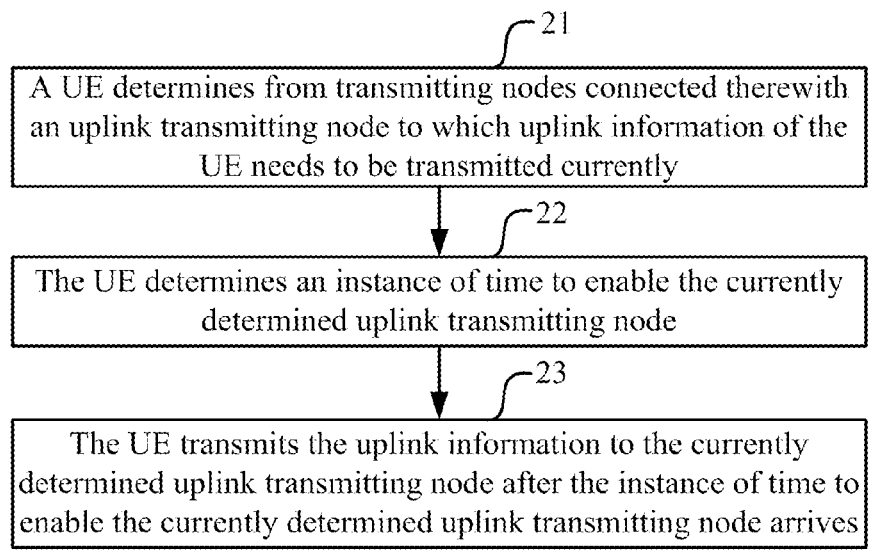
FIG. 2 illustrates a schematic flow chart of a method for transmitting uplink information according to an embodiment of the invention.

Further to the embodiment above, an embodiment of the invention further provides a method for transmitting uplink information, which is applicable to a scenario where a UE supports only uplink transmission to a single node, and referring to FIG. 2, the method includes:

Operation 21. A UE determines from transmitting nodes connected therewith an uplink transmitting node to which uplink information of the UE needs to be transmitted currently;

Operation 22. The UE determines an instance of time to enable the currently determined uplink transmitting node; and Operation 23. The UE transmits the uplink information to the currently determined uplink transmitting node after the instance of time to enable the currently determined uplink transmitting node arrives.

Furthermore the UE can determine the uplink transmitting node to which the uplink information of the UE needs to be transmitted currently in the following three approaches:

In an approach A2, the macro eNB selects an appropriate transmitting node for the UE as the currently determined uplink transmitting node; and here the operation 21 includes:

The UE determines a transmitting node serving a cell corresponding to identifier information signaled by the macro eNB as the currently determined uplink transmitting node upon reception of the identifier information, and the identifier information includes identifier information of one or more cells of the transmitting node selected by the macro eNB for the UE.

Furthermore the UE determines the instance of time to enable the currently determined uplink transmitting node in the operation 22 as follows:

The UE determines the instance of time to enable the currently determined uplink transmitting node, according to an instance of time when the macro eNB transmits the signaling, and an enabling instance of time prescribed between the UE and the macro eNB; or The UE determines an instance of time when the UE receives the identifier information transmitted by the macro eNB as the instance of time to enable the currently determined uplink transmitting node; or If the signaling transmitted by the macro eNB is physical layer signaling, then the UE determines a sub-frame carrying the physical layer signaling as the instance of time to enable the currently determined uplink transmitting node.

Furthermore after the UE determines the uplink transmitting node to which the uplink information of the UE needs to be transmitted currently and before the instance of time to enable the currently determined uplink transmitting node arrives, the method according to the embodiment of the invention further includes:

The UE transmits the uplink information to a lastly determined uplink transmitting node.

Since this approach corresponds to the approach A1 above, reference can be made to the particular implementation of the approach A1, so a repeated description thereof will be omitted here.

In a second approach B2, the UE selects an appropriate transmitting node for the UE as the currently determined uplink transmitting node, and here the operation 22 includes:

The UE selects from the transmitting nodes connected therewith a transmitting node satisfying a preset determination criterion as the currently determined uplink transmitting node.

Furthermore the determination criterion can include but will not be limited to one or more of the following criterions:

The UE selects an uplink transmitting node corresponding to a serving cell with a value of RSRP being the highest or more than a preset RSRP threshold as the currently determined uplink transmitting node according to measurement results of the UE for respective serving cells, and the RSRP threshold is an empirical value and can be determined as needed in practice;

The UE selects an uplink transmitting node corresponding to a serving cell with a value of RSRQ being the highest or more than a preset RSRQ threshold as the currently determined uplink transmitting node according to measurement results of the UE for respective serving cells, and the RSRQ threshold is an empirical value and can be determined as needed in practice;

The UE selects an uplink transmitting node corresponding to a serving cell with a value of CQI being the highest or more than a preset CQI threshold as the currently determined uplink transmitting node according to measurement results of the UE for respective serving cells, and the CQI threshold is an empirical value and can be determined as needed in practice;

The UE selects an uplink transmitting node corresponding to a serving cell with a value of path loss being the lowest or no more than a preset path loss threshold as the currently determined uplink transmitting node according to measurement results of the UE for respective serving cells, and the path loss threshold is an empirical value and can be determined as needed in practice; and The UE determines distances between the UE and the respective transmitting nodes according to current location information of the UE and selects a transmitting node with the distance being the shortest or no more than a preset distance threshold as the currently determined uplink transmitting node, and the distance threshold is an empirical value and can be determined as needed in practice. Here this approach requires the UE to obtain deployment information of the macro eNB and local nodes (RRHs/repeaters, etc.), and the deployment information can be signaled by the macro eNB to the UE.

Furthermore in this approach, after the operation 21 and before the operation 22, the method according to the embodiment of the invention further includes:

The UE signals the currently determined uplink transmitting node to the macro eNB in higher-layer signaling upon determining that the currently determined uplink transmitting node is different from the lastly determined uplink transmitting node, and the higher-layer signaling carries the identifier information of the one or more cells corresponding to the currently determined uplink transmitting node.

Preferably the higher-layer signaling transmitted by the UE includes RRC signaling or MAC signaling.

Preferably the identifier information of the cell in the embodiment of the invention includes an index number of the cell; or can a combination of a Downlink (DL) frequency and a PCI; or can be an ECGI.

Furthermore if the UE signals the currently determined uplink transmitting node to the macro eNB in MAC signaling, then a dedicated LCID also needs to be introduced to the MAC signaling to indicate that the MAC signaling is used for indicating to the macro eNB a transmission node or a cell for uplink transmission.

Furthermore in this approach, the UE determines the instance of time to enable the currently determined uplink transmitting node particularly as follows:

The UE determines the instance of time to enable the currently determined uplink transmitting node, according to an instance of time when the UE transmits the higher-layer signaling, and an enabling instance of time prescribed between the UE and the macro eNB.

Furthermore after the operation 21 and before the instance of time to enable the currently determined uplink transmitting node arrives, the method according to the embodiment of the invention further includes:

The UE transmits the uplink information to the lastly determined uplink transmitting node.

In an approach C2, the UE determines the uplink transmitting node to currently transmit the uplink information, according to a rule prescribed between the UE and the macro eNB;

The prescribed rule in the embodiment of the invention can include but will not be limited to such a rule that a different transmitting node is selected in each preset change cycle as an uplink transmitting node determined each time.

The change cycles and offsets of the different UEs are configured by the macro eNB or prescribed between the macro eNB and the respective UEs.

Furthermore the UE determines the instance of time to enable the currently determined uplink transmitting node in the operation 22 particularly as follows:

The UE determines the instance of time to enable the currently determined uplink transmitting node, according to a current System Frame Number (SFN), sub-frame number and offset, and a change cycle corresponding to each uplink transmitting node.

For example, the UE determines an instance of time when the current SFN and sub-frame number satisfy Equation 1 as the instance of time to enable the currently determined uplink transmitting node, that is, the uplink transmitting node is switched at that instance time.

In the approach C1 and the approach C2, since the macro eNB and the UE determine the currently determined uplink transmitting node according to the prescribed rule, there will be no signaling interaction between the macro eNB and the UE to thereby save an overhead of system signaling.

In the embodiment of the invention, the operation 23 includes:

The UE transmits the uplink information over an uplink carrier corresponding to the currently determined uplink transmitting node.

Furthermore if a plurality of component carriers among the carriers aggregated for the UE are configured with PUCCHs, then the UE transmits the uplink information over the uplink carrier corresponding to the currently determined uplink transmitting node as follows:

The UE transmits the uplink information over a component carrier served by the currently determined uplink transmitting node and configured with a PUCCH.

In the embodiment of the invention, after the operation 22, the method further includes one or more of the following operations:

The UE deletes an uplink scheduling configuration, stored by the UE, corresponding to the lastly determined uplink transmitting node;

The UE stores a value of Timing Advance (TA) of a cell or a Timing Advance Group (TAG) corresponding to the lastly determined uplink transmitting node;

The UE stops an SRS, a DSR and a CQI from being transmitted to the lastly determined uplink transmitting node;

The UE determines a value of TA of the cell corresponding to the currently determined uplink transmitting node; and The UE deletes a Hybrid Automatic Repeat Request (HARQ) buffer, stored by the UE, of the cell corresponding to the lastly determined uplink transmitting node.

It shall be noted that the embodiment of the invention will not be limited to any order in which the five operations above are performed.

Furthermore the UE can determine the value of TA of the cell corresponding to the currently determined uplink transmitting node in the following two approaches:

In a first approach, after the UE determines the uplink transmitting node to which the uplink information of the UE needs to be transmitted currently, the UE determines the value of TA of the cell corresponding to the currently determined uplink transmitting node according to a received Timing Advance Command (TAC) MAC Control Element (CE) transmitted by the macro eNB, and the value of TA, stored by the UE, of the cell or the TAG corresponding to the lastly determined uplink transmitting node;

In this approach, when the uplink transmitting node is changed, the UE stores the value of TA of the cell or the TAG corresponding to the previously determined uplink transmitting node without handling a Timing Advance Timer (TAT) corresponding to the respective cell or TAG; and In a second approach, after the UE determines the uplink transmitting node to which the uplink information of the UE needs to be transmitted currently, the UE obtains the value of TA of the cell corresponding to the currently determined uplink transmitting node in a Random Access (RA) procedure;

In this approach, the UE stores only the value of TA of the cell or the TAG corresponding to the currently determined uplink transmitting node without storing the value of TA of the cell or the TAG corresponding to the lastly determined uplink transmitting node, and a TAT of the cell or the TAG corresponding to the lastly determined uplink transmitting node will be stopped from operating once the uplink transmitting node is changed.

Preferably after the operation 22, the method according to the embodiment of the invention further includes:

The UE releases an SRS and/or PUCCH configuration corresponding to the lastly determined uplink transmitting node.

The invention will be described below in connection with particular embodiments thereof in different scenarios.

Figure 3:
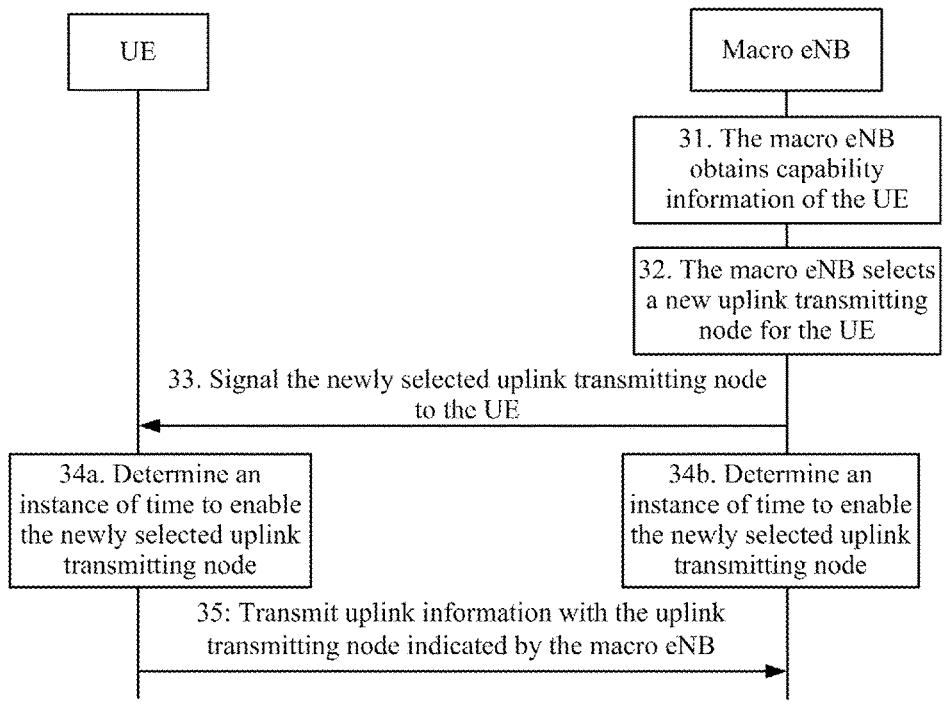
FIG. 3 illustrates a schematic flow chart of interaction between a macro base station and a UE in a first scenario according to an embodiment of the invention.

In a first embodiment, a macro eNB selects an appropriate uplink transmitting node for the UE, and referring to FIG. 3, a method for transmitting uplink information according to this embodiment includes the following operations:

Operation 31. A macro eNB obtains capability information of a UE and determines that the UE supports only uplink transmission to a single node at a time, according to the obtained capability information;

Operation 32. The macro eNB selects an uplink transmitting node for the UE to be currently used for transmission, according to a preset selection criterion;

Operation 33. The macro eNB signals the newly selected uplink transmitting node to the UE;

Operation 34a. The UE determines an instance of time to enable the newly selected uplink transmitting node;

Operation 34b. The macro NB determines an instance of time to enable the newly selected uplink transmitting node; and Operation 35. The UE transmits uplink information with the uplink transmitting node indicated by the macro eNB.

Furthermore the UE further performs one or more of the following actions according to the uplink transmitting node indicated by the macro eNB in the operation 33, and the instance of time, to enable the uplink transmitting node, determined in the operation 34a, after the newly configured uplink transmitting node is enabled:

The UE clears a HARQ buffer corresponding to a cell corresponding to an old uplink transmitting node;

The UE clears a configured UL grant corresponding to the old uplink transmitting node;

The UE stops an SRS, a DSR and a CQ from being transmitted with the old uplink transmitting node; and furthermore the UE can further release an SRS/PUCCH configuration corresponding to the old uplink transmitting node;

The UE maintains a value of TA of a cell or a TAG corresponding to the old transmitting node; and The UE determines a value of TA of a cell corresponding to the new uplink transmitting node.

In this embodiment, the operation 34a and the operation 34b may not be performed in any particular order, and here firstly the operation 34a and then the operation 34b can be performed; or firstly the operation 34b and then the operation 34a can be performed; or both the operation 34a and the operation 34b can be performed at the same time.

Figure 4:
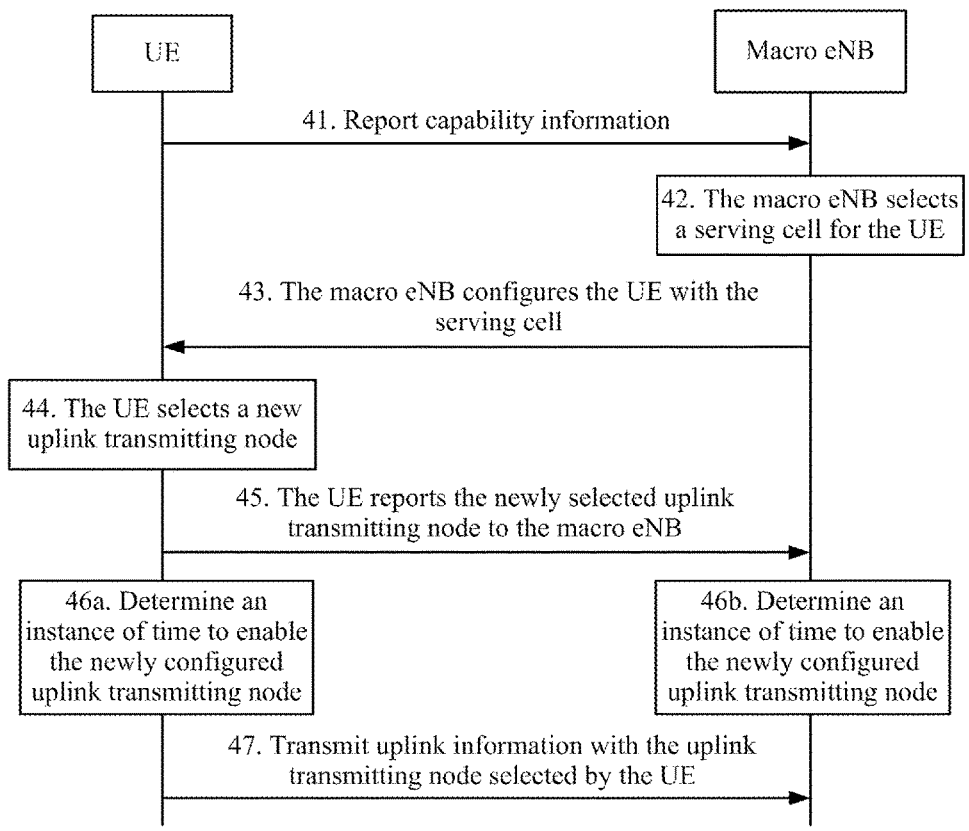
FIG. 4 illustrates a schematic flow chart of interaction between a macro base station and a UE in a second scenario according to an embodiment of the invention.

In a second embodiment, a UE selects an appropriate uplink transmitting node for the UE, and referring to FIG. 4, a method for transmitting uplink information according to this embodiment includes the following steps:

Operation 41. A macro eNB determines that a UE supports only uplink transmission to a single node at a time, according to capability information of the UE reported by the UE;

Operation 42. The macro eNB selects a serving cell for the UE;

The macro eNB can select the serving cell for the UE according to one or more of the following information:

A measurement result reported by the UE, including one or more of RSRP, an RSRQ and a CQI;

Location information of the UE reported by the UE;

The capability information of the UE reported by the UE, e.g., a combination of bands supportable by the UE; and Loads and interference conditions of respective cells served by the macro eNB;

Operation 43. The macro eNB signals the serving cell configured for the UE to the UE;

Since a PCell has been selected when an RRC connection is set up or when the transmitting node is switched, only configured SCells will be signaled here;

Operation 44. The UE selects a new uplink transmitting node for the UE according to a preset determination criterion;

Operation 45. The UE reports the new uplink transmitting node selected by the UE to the macro eNB;

Operation 46a. The UE determines an instance of time to enable the newly selected uplink transmitting node;

Operation 46b. The macro eNB determines an instance of time to enable the newly selected uplink transmitting node; and Operation 47. The UE performs uplink transmission with the new uplink transmitting node selected by the UE.

Furthermore the UE further performs one or more of the following actions according to the uplink transmitting node selected by the UE in the operation 44, and the instance of time, to enable the uplink transmitting node, determined in the operation 46a, after the newly configured uplink transmitting node is enabled:

The UE clears a HARQ buffer corresponding to a cell corresponding to an old uplink transmitting node;

The UE clears a configured UL grant corresponding to the old uplink transmitting node;

The UE stops an SRS, a DSR and a CQI from being transmitted with the old uplink transmitting node; and furthermore the UE can further release an SRS/PUCCH configuration corresponding to the old uplink transmitting node;

The UE maintains a value of TA of a cell or a TAG corresponding to the old transmitting node; and The UE determines a value of TA of a cell corresponding to the new uplink transmitting node.

In this embodiment, the operation 46a and the operation 46b may not be performed in any particular order, and here firstly the operation 46a and then the operation 46b can be performed; or firstly the operation 46b and then the operation 46a can be performed; or both the operation 46a and the operation 46b can be performed at the same time.

Figure 5:
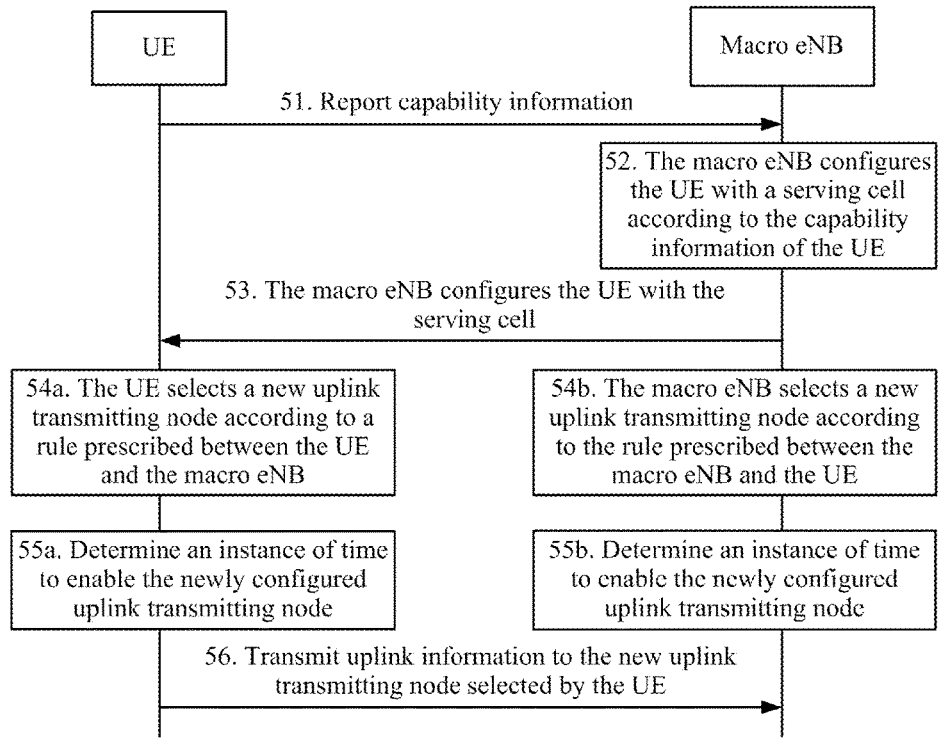
FIG. 5 illustrates a schematic flow chart of interaction between a macro base station and a UE in a third scenario according to an embodiment of the invention.

In a third embodiment, a UE selects an appropriate uplink transmitting node for the UE, and referring to FIG. 5, a method for transmitting uplink information according to this embodiment includes the following operations:

Operation 51. A macro eNB determines that a UE supports only uplink transmission to a single node at a time, according to capability information of the UE reported by the UE;

Operation 52. The macro eNB selects a serving cell for the UE;

Here the macro eNB can select the serving cell for the UE according to one or more of the following information:

A measurement result reported by the UE, including one or more of RSRP, an RSRQ and a CQI;

Location information of the UE reported by the UE;

The capability information of the UE reported by the UE, e.g., a combination of bands supportable by the UE; and Loads and interference conditions of respective cells served by the macro eNB;

Operation 53. The macro eNB signals the serving cell configured for the UE to the UE;

Since a PCell has been selected when an RRC connection is set up or when the transmitting node is switched, only configured SCells will be signaled here;

Operation 54a. The UE selects a new uplink transmitting node according to a preset prescribed rule;

Operation 54b. The macro eNB selects a new uplink transmitting node according to the prescribed rule;

Operation 55a. The UE determines an instance of time to enable the newly selected uplink transmitting node;

Operation 55b. The macro eNB determines an instance of time to enable the newly selected uplink transmitting node; and Operation 56. The UE performs uplink transmission with the newly selected uplink transmitting node.

Furthermore the UE further performs one or more of the following actions according to the uplink transmitting node selected by the UE in the operation 54a, and the instance of time, to enable the uplink transmitting node, determined in the operation 55a, after the newly configured uplink transmitting node is enabled:

The UE clears a HARQ buffer corresponding to a cell corresponding to an old uplink transmitting node;

The UE clears a configured UL grant corresponding to the old uplink transmitting node;

The UE stops an SRS, a DSR and a CQ from being transmitted with the old uplink transmitting node; and furthermore the UE can further release an SRS/PUCCH configuration corresponding to the old uplink transmitting node;

The UE maintains a value of TA of a cell or a TAG corresponding to the old transmitting node; and The UE determines a value of TA of a cell corresponding to the new uplink transmitting node.

In this embodiment, the operation 54a and the operation 54b may not be performed in any particular order, and here firstly the operation 54a and then the operation 54b can be performed; or firstly the operation 54b and then the operation 54a can be performed; or both the operation 54a and the operation 54b can be performed at the same time; and The operation 55a and the operation 55b may not be performed in any particular order, and here firstly the operation 55a and then the operation 55b can be performed; or firstly the operation 55b and then the operation 55a can be performed; or both the operation 55a and the operation 55b can be performed at the same time.

The processing flows of the methods above can be performed in software program which can be stored in a storage medium, and the stored software program can perform the operations of the method above upon being invoked.

Based upon the same inventive idea, an embodiment of the invention further provides a macro eNB, and since the macro eNB addresses the problem under a similar principle to the method for receiving uplink information illustrated in FIG. 1, reference can be made to the implementation of the method illustrated in FIG. 1, so a repeated description thereof will be omitted here.

Figure 6:
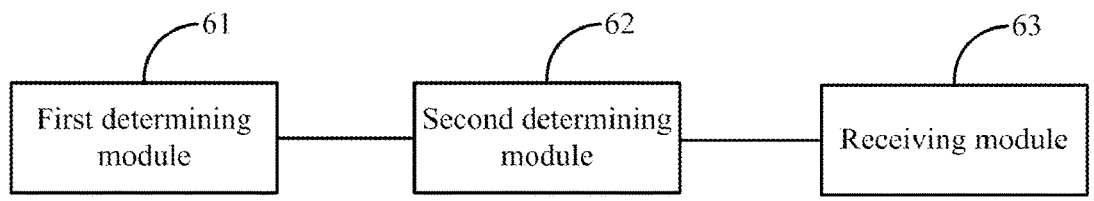
FIG. 6 illustrates a schematic diagram of a macro base station according to an embodiment of the invention.

Referring to FIG. 6, a macro eNB according to an embodiment of the invention includes:

A first determining module 61 is configured to determine from transmitting nodes connected with a UE an uplink transmitting node for currently receiving uplink information of the UE;

A second determining module 62 is configured to determine an instance of time to enable the currently determined uplink transmitting node; and A receiving module 63 is configured to receive the uplink information transmitted by the UE through the currently determined uplink transmitting node after the instance of time to enable the currently determined uplink transmitting node arrives.

Furthermore the first determining module 61 is configured:

To select from the transmitting nodes connected with the UE a transmitting node satisfying a preset selection criterion as the currently determined uplink transmitting node; or To determine a transmitting node serving a cell corresponding to identifier information transmitted by the UE in higher-layer signaling as the currently determined uplink transmitting node upon reception of the identifier information, and the identifier information includes identifier information of one or more cells corresponding to the uplink transmitting node selected by the UE for itself; or To determine the uplink transmitting node for currently receiving the uplink information of the UE, according to a rule prescribed between the macro eNB and the UE.

In the embodiment of the invention, the selection criterion includes one or more of the following criterions:

Distances between the UE and the respective transmitting nodes are determined according to current location information of the UE, and a transmitting node with the distance being the shortest or no more than a preset distance threshold is selected as the currently determined uplink transmitting node;

A transmitting node corresponding to a cell with a path loss being the lowest or no more than a preset path loss threshold is selected as the currently determined uplink transmitting node according to path loss information of the UE in respective cells;

A transmitting node corresponding to a cell with a value of Reference Signal Received Power (RSRP) being the highest or more than a preset RSRP threshold is selected as the currently determined uplink transmitting node according to reference signal reception conditions of the UE in respective cells;

A transmitting node corresponding to a cell with a value of Reference Signal Received Quality (RSRQ) being the highest or more than a preset RSRQ threshold is selected as the currently determined uplink transmitting node according to reference signal reception conditions of the UE in respective cells;

a transmitting node corresponding to a cell with a value of CQI being the highest or more than a preset CQI threshold is selected as the currently determined uplink transmitting node according to reference signal reception conditions of the UE in respective cells; and A transmitting node corresponding to a cell with a value of Sounding Reference Signal (SRS) reception quality being the highest or more than a preset SRS threshold is selected as the currently determined uplink transmitting node according to reception qualities of the SRSs transmitted by the UE in respective cells.

In the embodiment of the invention, the prescribed rule includes such a rule that a different transmitting node is selected in each preset change cycle as an uplink transmitting node determined each time.

Preferably the change cycles and offsets of different UEs are configured by the macro eNB or prescribed between the macro eNB and the respective UEs.

Furthermore the first determining module 61 is further configured:

To signal the currently determined uplink transmitting node to the UE if it is determined that the currently determined uplink transmitting node is different from a lastly determined uplink transmitting node after the transmitting node satisfying the preset selection criterion is selected as the currently determined uplink transmitting node and before the instance of time to enable the currently determined uplink transmitting node is determined, where the signaling carries the identifier information of the one or more cells corresponding to the currently determined uplink transmitting node.

Preferably the identifier information is an index number of the cell; or the identifier information is a combination of a downlink (DL) frequency and a Physical Cell Identifier (PCI); or the identifier information is an ECGI.

Furthermore the second determining module 62 is configured:

To determine the instance of time to enable the currently determined uplink transmitting node, according to an instance of time when the macro eNB transmits the signaling, and an enabling instance of time prescribed between the macro eNB and the UE; or To determine an instance of time when the macro eNB receives an HARQ ACK feedback or an RRC response message transmitted by the UE for the signaling as the instance of time to enable the currently determined uplink transmitting node; or If the signaling transmitted by the macro eNB is physical layer signaling, to determine a sub-frame carrying the physical layer signaling as the instance of time to enable the currently determined uplink transmitting node; or To determine the instance of time to enable the currently determined uplink transmitting node, according to an instance of time when the UE transmits the higher-layer signaling, and an enabling instance of time prescribed between the macro eNB and the UE; or To determine the instance of time to enable the currently determined uplink transmitting node, according to a current System Frame Number (SFN), sub-frame number and offset, and a change cycle corresponding to each uplink transmitting node.

Furthermore the second determining module 62 is configured:

If the enabling instance of time is an instance of time when the UE receives the identifier information transmitted by the macro eNB, to determine that the instance of time to enable the currently determined uplink transmitting node arrives, after the RRC response message or the acknowledgement ACK feedback is received on the currently determined uplink transmitting node.

Furthermore if the second determining module 62 determines the instance of time to enable the currently determined uplink transmitting node, according to the instance of time when the macro eNB transmits the signaling, and the enabling instance of time prescribed between the macro eNB and the UE, then accordingly the receiving module 63 is configured to receive the uplink information transmitted by the UE through a lastly determined uplink transmitting node; or to terminate uplink/downlink scheduling for the UE, after the currently determined uplink transmitting node is signaled to the UE and before the instance of time to enable the currently determined uplink transmitting node arrives; and If the second determining module 62 determines the instance of time when the macro eNB receives the HARQ ACK feedback or the RRC response message transmitted by the UE for the signaling as the instance of time to enable the currently determined uplink transmitting node, then accordingly the receiving module 63 is configured to detect the uplink information transmitted by the UE respectively through a lastly determined uplink transmitting node and the currently determined uplink transmitting node; or to terminate uplink/downlink scheduling for the UE, after the currently determined uplink transmitting node is signaled to the UE and before the instance of time to enable the currently determined uplink transmitting node arrives.

Figure 7:
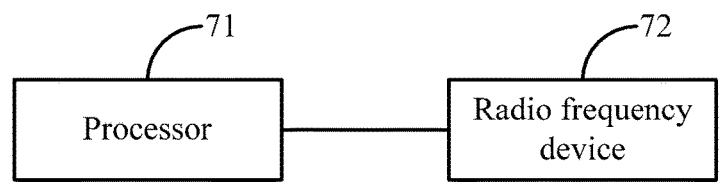
FIG. 7 illustrates a schematic diagram of another macro base station according to an embodiment of the invention.

Based upon the same inventive idea as the method, an embodiment of the invention further provides another macro eNB, as illustrated in FIG. 7, including a processor 71 and a radio frequency device 72, where:

The processor 71 is configured to determine from transmitting nodes connected with a UE an uplink transmitting node for currently receiving uplink information of the UE; and to determine an instance of time to enable the currently determined uplink transmitting node; and The radio frequency device 72 is configured to receive the uplink information transmitted by the UE through the currently determined uplink transmitting node after the instance of time to enable the currently determined uplink transmitting node arrives.

With the embodiments of the invention, an appropriate uplink transmitting node can be determined flexibly to transmit uplink information in the heterogeneous network to thereby lower a burden on the macro eNB, alleviate uplink interference between the respective UEs, improve the throughput of the system, and save power of the UE.

Based upon the same inventive idea, an embodiment of the invention further provides a UE, and since the UE addresses the problem under a similar principle to the method for transmitting uplink information illustrated in FIG. 2, reference can be made to the implementation of the method illustrated in FIG. 2, so a repeated description thereof will be omitted here.

Figure 8:
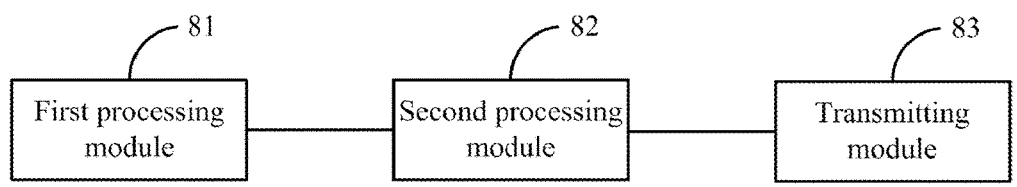
FIG. 8 illustrates a schematic diagram of a UE according to an embodiment of the invention.

Referring to FIG. 8, a UE according to an embodiment of the invention includes:

A first processing module 81 is configured to determine from transmitting nodes connected with the UE an uplink transmitting node to which uplink information of the UE needs to be transmitted currently;

A second processing module 82 is configured to determine an instance of time to enable the currently determined uplink transmitting node; and A transmitting module 83 is configured to transmit the uplink information to the currently determined uplink transmitting node after the instance of time to enable the currently determined uplink transmitting node arrives.

Furthermore the first processing module 81 is configured:

To select from the transmitting nodes connected with the UE a transmitting node satisfying a preset determination criterion as the currently determined uplink transmitting node; or To determine a transmitting node serving a cell corresponding to identifier information signaled by a macro eNB as the currently determined uplink transmitting node upon reception of the identifier information, where the identifier information includes identifier information of one or more cells corresponding to the uplink transmitting node selected by the macro eNB for the UE; or To determine the uplink transmitting node to which the uplink information of the UE needs to be transmitted currently, according to a rule prescribed between the UE and the macro eNB.

In the embodiment of the invention, the selection criterion includes one or more of the following criterions:

The UE selects an uplink transmitting node corresponding to a serving cell with a value of RSRP being the highest or more than a preset RSRP threshold as the currently determined uplink transmitting node according to measurement results of the UE for respective serving cells;

The UE selects an uplink transmitting node corresponding to a serving cell with a value of RSRQ being the highest or more than a preset RSRQ threshold as the currently determined uplink transmitting node according to measurement results of the UE for respective serving cells;

The UE selects an uplink transmitting node corresponding to a serving cell with a value of CQI being the highest or more than a preset CQI threshold as the currently determined uplink transmitting node according to measurement results of the UE for respective serving cells;

The UE selects an uplink transmitting node corresponding to a serving cell with a value of path loss being the lowest as the currently determined uplink transmitting node according to measurement results of the UE for respective serving cells; and The UE determines distances between the UE and the respective transmitting nodes according to current location information of the UE and selects a transmitting node with the distance being the shortest as the currently determined uplink transmitting node.

In the embodiment of the invention, the prescribed rule includes such a rule that a different transmitting node is selected in each preset change cycle as an uplink transmitting node determined each time.

Preferably the change cycles and offsets of different UEs are configured by the macro eNB or prescribed between the macro eNB and the respective UEs.

Furthermore the first processing module 81 is further configured:

To signal the currently determined uplink transmitting node to the macro eNB in higher-layer signaling if it is determined that the currently determined uplink transmitting node is different from a lastly determined uplink transmitting node after the transmitting node satisfying the preset determination criterion is selected as the currently determined uplink transmitting node and before the instance of time to enable the currently determined uplink transmitting node is determined, where the higher-layer signaling carries the identifier information of the one or more cells corresponding to the currently determined uplink transmitting node.

Preferably the identifier information is an index number of the cell; or the identifier information is a combination of a downlink (DL) frequency and a Physical Cell Identifier (PCI); or the identifier information is an ECGI.

Furthermore the second processing module 82 is configured:

To determine the instance of time to enable the currently determined uplink transmitting node, according to an instance of time when the UE transmits the higher-layer signaling, and an enabling instance of time prescribed between the UE and the macro eNB; or To determine the instance of time to enable the currently determined uplink transmitting node, according to an instance of time when the macro eNB transmits the signaling, and an enabling instance of time prescribed between the UE and the macro eNB; or To determine an instance of time when the UE receives the identifier information transmitted by the macro eNB as the instance of time to enable the currently determined uplink transmitting node; or If the signaling transmitted by the macro eNB is physical layer signaling, to determine a sub-frame carrying the physical layer signaling as the instance of time to enable the currently determined uplink transmitting node; or To determine the instance of time to enable the currently determined uplink transmitting node, according to a current System Frame Number (SFN), sub-frame number and offset, and a change cycle corresponding to each uplink transmitting node.

Furthermore the transmitting module 83 is further configured to transmit the uplink information to a lastly determined uplink transmitting node before the first processing module 71 determines the uplink transmitting node to which the uplink information of the UE needs to be transmitted currently and before the enabling instance of time determined by the second determining module 82 arrives.

Furthermore the transmitting module 83 is configured to transmit the uplink information over an uplink carrier corresponding to the currently determined uplink transmitting node.

Preferably the transmitting module 83 is further configured to transmit the uplink information over a component carrier served by the currently determined uplink transmitting node and configured with a Physical Uplink Control Channel (PUCCH) if a plurality of component carriers among the carriers aggregated for the UE are configured with PUCCHs.

Furthermore the second processing module 82 is further configured to perform one or more of the following operations after the instance of time to enable the currently determined uplink transmitting node is determined.

To delete an uplink scheduling configuration, stored by the UE, corresponding to the lastly determined uplink transmitting node;

To store a value of TA of a cell or a TAG corresponding to the lastly determined uplink transmitting node;

To stop an SRS, a DSR and a CQI from being transmitted to the lastly determined uplink transmitting node;

To determine a value of TA of the cell corresponding to the currently determined uplink transmitting node; and To delete a Hybrid Automatic Repeat Request (HARQ) buffer, stored by the UE, of the cell corresponding to the lastly determined uplink transmitting node.

Furthermore the transmitting module 83 is configured:

To determine the value of TA of the cell corresponding to the currently determined uplink transmitting node according to a received TAC MAC CE transmitted by the macro eNB, and the value of TA, stored by the UE, of the cell or the TAG corresponding to the lastly determined uplink transmitting node after the uplink transmitting node to currently transmit the uplink information is determined; or To obtain the value of TA of the cell corresponding to the currently determined uplink transmitting node in a Random Access (RA) procedure after the uplink transmitting node to currently transmit the uplink information is determined.

Figure 9:
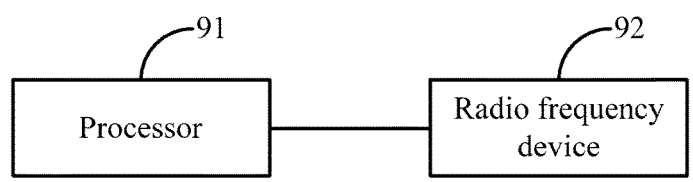
FIG. 9 illustrates a schematic diagram of another UE according to an embodiment of the invention.

An embodiment of the invention provides another UE, as illustrated in FIG. 9, including a processor 91 and a radio frequency device 92, where:

The processor 91 is configured to determine from transmitting nodes connected with the UE an uplink transmitting node to which uplink information of the UE needs to be transmitted currently; and to determine an instance of time to enable the currently determined uplink transmitting node; and The radio frequency device 92 is configured to transmit the uplink information to the currently determined uplink transmitting node after the instance of time to enable the currently determined uplink transmitting node arrives.

With the embodiments of the invention, an appropriate uplink transmitting node can be determined flexibly to transmit uplink information in the heterogeneous network to thereby lower a burden on the macro eNB, alleviate uplink interference between the respective UEs, improve the throughput of the system, and save power of the UE.

Figure 10:
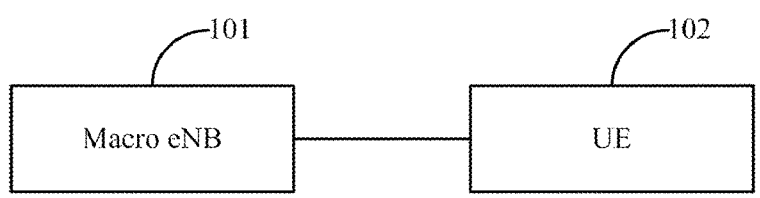
FIG. 10 illustrates a schematic diagram of a communicating system according to an embodiment of the invention.

Further to the embodiments above, an embodiment of the invention further provides a communicating system, and referring to FIG. 10, the communicating system includes:

A macro eNB 101 is configured to determine from transmitting nodes connected with a UE 82 an uplink transmitting node for currently receiving uplink information of the UE 82; to determine an instance of time to enable the currently determined uplink transmitting node; and to receive the uplink information transmitted by the UE 82 through the currently determined uplink transmitting node after the instance of time to enable the currently determined uplink transmitting node arrives; and The UE 102 is configured to determine from the transmitting nodes connected with the UE the uplink transmitting node to which uplink information of the UE needs to be transmitted currently; to determine the instance of time to enable the currently determined uplink transmitting node; and to transmit the uplink information to the currently determined uplink transmitting node after the instance of time to enable the currently determined uplink transmitting node arrives.

With the embodiments of the invention, an appropriate uplink transmitting node can be determined flexibly to transmit uplink information in the heterogeneous network to thereby lower a burden on the macro eNB, alleviate uplink interference between the respective UEs, improve the throughput of the system, and save power of the UE.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for receiving uplink information, the method comprising:
   determining, by a macro base station, from transmitting nodes connected with a User Equipment (UE) an uplink transmitting node for currently receiving uplink information of the UE, wherein determining, by the macro base station, the uplink transmitting node for currently receiving the uplink information of the UE comprises:
      selecting, by the macro base station, from the transmitting nodes connected with the UE a transmitting node satisfying a preset selection criterion as the currently determined uplink transmitting node; or
      determining, by the macro base station, a transmitting node, which serves a cell corresponding to identifier information transmitted by the UE in higher-layer signaling, as the currently determined uplink transmitting node upon reception of the identifier information, wherein the identifier information comprises identifier information of one or more cells corresponding to the uplink transmitting node selected by the UE for itself; or
      determining, by the macro base station, the uplink transmitting node for currently receiving the uplink information of the UE, according to a rule prescribed between the macro base station and the UE, wherein after the macro base station selects the transmitting node satisfying the preset selection criterion as the currently determined uplink transmitting node, and before the macro base station determines the instance of time to enable the currently determined uplink transmitting node, the method further comprises:
         signaling, by the macro base station, the currently determined uplink transmitting node to the UE upon determining that the currently determined uplink transmitting node is different from a lastly determined uplink transmitting node, wherein the signaling carries the identifier information of the one or more cells corresponding to the currently determined uplink transmitting node; wherein the signaling comprises Radio Resource Control (RRC) signaling, Media Access Control (MAC) signaling or physical layer signaling; and
      wherein if the signaling is the physical layer signaling, then determining, by the macro base station, the uplink transmitting node for currently receiving the uplink information of the UE comprises:
         at a specified instance of time, if there is a demand for uplink transmission over any one of component carriers aggregated for the UE, then determining, by the macro base station, a transmitting node serving the component carrier, over which there is the demand for uplink transmission, as the currently determined uplink transmitting node:
         determining, by the macro base station, an instance of time to enable the currently determined uplink transmitting node; and
         receiving, by the macro base station, the uplink information transmitted by the UE through the currently determined uplink transmitting node after the instance of time to enable the currently determined uplink transmitting node arrives.

2. The method according to claim 1, wherein before the macro base station determines the uplink transmitting node for currently receiving uplink information of the UE, the method further comprises: determining, by the macro base station, that the UE supports uplink transmission to a single node at a time, according to obtained capability information of the UE; wherein the macro base station determines that the UE supports uplink transmission to a single node at a time, in the following approaches: if the capability information of the UE carries first indication information for indicating a number of Radio Frequencies (RFs) comprised in the UE, and the first indication information indicates the number as 1, then the macro base station determines that the UE supports uplink transmission to a single node at a time; if the capability information of the UE carries second indication information for indicating whether the UE supports Multiple Timing Advance (MTA), and the second indication information indicates that the UE does not support the MTA, then the macro base station determines that the UE supports uplink transmission to a single node at a time; and if the capability information of the UE carries third indication information for indicating whether the UE supports uplink transmission to a single node at a time, and the third indication information indicates that the UE supports uplink transmission to a single node at a time, then the macro base station determines that the UE supports uplink transmission to a single node at a time.

3. The method according to claim 1, wherein the selection criterion comprises one or more of the following criterions: the macro base station determines distances between the UE and the respective transmitting nodes according to current location information of the UE and selects a transmitting node with the distance being the shortest or no more than a preset distance threshold as the currently determined uplink transmitting node; the macro base station selects a transmitting node corresponding to a cell with a path loss being the lowest or no more than a preset path loss threshold as the currently determined uplink transmitting node according to path loss information of the UE in respective cells; the macro base station selects a transmitting node corresponding to a cell with a value of Reference Signal Received Quality (RSRQ) being the highest or more than a preset RSRQ threshold as the currently determined uplink transmitting node according to reference signal reception conditions of the UE in respective cells; the macro base station selects a transmitting node corresponding to a cell with a value of Reference Signal Received Power (RSRP) being the highest or more than a preset RSRP threshold as the currently determined uplink transmitting node according to reference signal reception conditions of the UE in respective cells; the macro base station selects a transmitting node corresponding to a cell with a value of Channel Quality Indicator (CQI) being the highest or more than a preset CQI threshold as the currently determined uplink transmitting node according to reference signal reception conditions of the UE in respective cells; and the macro base station selects a transmitting node corresponding to a cell with a value of Sounding Reference Signal (SRS) reception quality being the highest or more than a preset SRS threshold as the currently determined uplink transmitting node according to reception qualities of SRSs transmitted by the UE in respective cells.

4. The method according to claim 1, wherein the prescribed rule comprises such a rule that a different transmitting node is selected in each preset change cycle as an uplink transmitting node determined each time; wherein the change cycles and offsets of different UEs are configured by the macro base station or prescribed between the macro base station and the respective UEs.

5. The method according to claim 1, wherein determining, by the macro base station, the instance of time to enable the currently determined uplink transmitting node comprises: determining, by the macro base station, the instance of time to enable the currently determined uplink transmitting node, according to an instance of time when the macro base station transmits the signaling, and an enabling instance of time prescribed between the macro base station and the UE; or determining, by the macro base station, an instance of time when the macro base station receives a Hybrid Automatic Repeat Request (HARQ) Acknowledgement (ACK) feedback or an RRC response message transmitted by the UE for the signaling as the instance of time to enable the currently determined uplink transmitting node; or if the signaling is physical layer signaling, then determining, by the macro base station, a sub-frame carrying the physical layer signaling as the instance of time to enable the currently determined uplink transmitting node; or determining, by the macro base station, the instance of time to enable the currently determined uplink transmitting node, according to an instance of time when the UE transmits the higher-layer signaling, and an enabling instance of time prescribed between the macro base station and the UE; or determining, by the macro base station, the instance of time to enable the currently determined uplink transmitting node, according to a current System Frame Number (SFN), sub-frame number and offset, and a change cycle corresponding to the uplink transmitting node; wherein if the macro base station determines the instance of time to enable the currently determined uplink transmitting node, according to the instance of time when the signaling is transmitted, and the enabling instance of time prescribed between the macro base station and the UE, then after the macro base station signals the currently determined uplink transmitting node to the UE and before the instance of time to enable the currently determined uplink transmitting node arrives, the method further comprises: receiving, by the macro base station, the uplink information transmitted by the UE through a lastly determined uplink transmitting node; or terminating, by the macro base station, uplink/downlink scheduling for the UE; wherein if the macro base station determines the instance of time when the macro base station receives the HARQ ACK feedback or the RRC response message transmitted by the UE for the signaling as the instance of time to enable the currently determined uplink transmitting node, then after the macro base station signals the currently determined uplink transmitting node to the UE and before the instance of time to enable the currently determined uplink transmitting node arrives, the method further comprises: detecting, by the macro base station, the uplink information transmitted by the UE respectively through a lastly determined uplink transmitting node and the currently determined uplink transmitting node; or terminating, by the macro base station, uplink/downlink scheduling for the UE.

6. A macro base station, comprising a processor and a radio frequency device, wherein: the processor is configured to:
determine from transmitting nodes connected with a User Equipment (UE) an uplink transmitting node for currently receiving uplink information of the UE, wherein determining, by the macro base station, the uplink transmitting node for currently receiving the uplink information of the UE comprises:
selecting, by the macro base station, from the transmitting nodes connected with the UE a transmitting node satisfying a preset selection criterion as the currently determined uplink transmitting node; or
determining, by the macro base station, a transmitting node, which serves a cell corresponding to identifier information transmitted by the UE in higher-layer signaling, as the currently determined uplink transmitting node upon reception of the identifier information, wherein the identifier information comprises identifier information of one or more cells corresponding to the uplink transmitting node selected by the UE for itself; or
determining, by the macro base station, the uplink transmitting node for currently receiving the uplink information of the UE, according to a rule prescribed between the macro base station and the UE, wherein after the macro base station selects the transmitting node satisfying the preset selection criterion as the currently determined uplink transmitting node, and before the macro base station determines the instance of time to enable the currently determined uplink transmitting node, the method further comprises:
signaling, by the macro base station, the currently determined uplink transmitting node to the UE upon determining that the currently determined uplink transmitting node is different from a lastly determined uplink transmitting node, wherein the signaling carries the identifier information of the one or more cells corresponding to the currently determined uplink transmitting node; wherein the signaling comprises Radio Resource Control (RRC) signaling, Media Access Control (MAC) signaling or physical layer signaling; and
wherein if the signaling is the physical layer signaling, then determining, by the macro base station, the uplink transmitting node for currently receiving the uplink information of the UE comprises:
at a specified instance of time, if there is a demand for uplink transmission over any one of component carriers aggregated for the UE, then determining, by the macro base station, a transmitting node serving the component carrier, over which there is the demand for uplink transmission, as the currently determined uplink transmitting node; and
determine an instance of time to enable the currently determined uplink transmitting node; and the radio frequency device is configured to receive the uplink information transmitted by the UE through the currently determined uplink transmitting node after the instance of time to enable the currently determined uplink transmitting node arrives.

* * * * *